US 11,811,081 B2

(12) United States Patent
Nakayama et al.

(10) Patent No.: US 11,811,081 B2
(45) Date of Patent: Nov. 7, 2023

(54) VENTILATION UNIT

(71) Applicant: NITTO DENKO CORPORATION, Ibaraki (JP)

(72) Inventors: Yusuke Nakayama, Ibaraki (JP); Youzou Yano, Ibaraki (JP); Kou Uemura, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 374 days.

(21) Appl. No.: 17/253,715

(22) PCT Filed: Jun. 11, 2019

(86) PCT No.: PCT/JP2019/023146
§ 371 (c)(1),
(2) Date: Dec. 18, 2020

(87) PCT Pub. No.: WO2019/244723
PCT Pub. Date: Dec. 26, 2019

(65) Prior Publication Data
US 2021/0265697 A1    Aug. 26, 2021

(30) Foreign Application Priority Data

Jun. 20, 2018  (JP) ................................. 2018-117314

(51) Int. Cl.
*H01M 50/233* (2021.01)
*H01M 50/325* (2021.01)

(52) U.S. Cl.
CPC ....... *H01M 50/233* (2021.01); *H01M 50/325* (2021.01); *H01M 2220/20* (2013.01)

(58) Field of Classification Search
CPC ............. H01M 50/233; H01M 50/325; H01M 2220/20; H01M 10/625; H01M 10/6561;
(Continued)

(56) References Cited

U.S. PATENT DOCUMENTS

2009/0029641 A1    1/2009  Furuuchi
2011/0016836 A1    1/2011  Yano
(Continued)

FOREIGN PATENT DOCUMENTS

EP    2560469 A1    2/2013
JP    2006-324086 A    11/2006
(Continued)

OTHER PUBLICATIONS

Sep. 3, 2019 International Search Report issued in International Patent Application No. PCT/JP2019/023146.

*Primary Examiner* — Jacob M Amick
*Assistant Examiner* — Charles J Brauch
(74) *Attorney, Agent, or Firm* — Oliff PLC

(57) ABSTRACT

A ventilation unit with: a ventilation body that allows gas to circulate between the outside and inside of a housing; a support member that supports the body attached to an opening portion formed in the housing; and a sealing member between the support member and the outer surface around the housing opening portion and seals a gap between the support member and the housing, wherein the unit performs ventilation between the outside and inside of the housing through the body while attached to the opening portion of the housing. The support member includes: an attachment portion to which the sealing member is attached; and a wall portion around the attachment portion, wherein, in a state where the support member is attached between the support member and the housing, a distance between the support member and an external surface in the support member wall portion is 5.0 mm or more.

18 Claims, 12 Drawing Sheets

(58) Field of Classification Search
CPC .... H01M 10/60; H01M 50/143; H01M 50/30; F16B 21/02; F16B 21/08; F16C 2326/01; F16C 2380/00; Y02E 60/10; H05K 5/068; H05K 5/061

See application file for complete search history.

(56) References Cited

U.S. PATENT DOCUMENTS

| | | |
|---|---|---|
| 2013/0055898 A1 | 3/2013 | Yano |
| 2017/0156228 A1 | 6/2017 | Jemura et al. |
| 2018/0097214 A1 | 4/2018 | Ogawa et al. |
| 2020/0340592 A1 | 10/2020 | Nakayama et al. |

FOREIGN PATENT DOCUMENTS

| | | | | |
|---|---|---|---|---|
| JP | 2009-252508 A | 10/2009 | | |
| JP | 2009252508 A | * 10/2009 | ......... | B60R 16/0239 |
| JP | 2012059739 A | * 3/2012 | | |
| JP | 2012-243536 A | 12/2012 | | |
| JP | 2013-168293 A | 8/2013 | | |
| JP | 2014-120579 A | 6/2014 | | |
| JP | 2015-228428 A | 12/2015 | | |
| WO | 2018/199238 A1 | 11/2018 | | |

* cited by examiner

FIG.6

| SAMPLE No. | HARDNESS OF O RING [°] | WIRE DIAMETER OF O RING [mm] | OUTER DIAMETER OF O RING [mm] | INNER DIAMETER OF O RING [mm] | OUTER DIAMETER OF OUTER CIRCUMFERENTIAL SURFACE OF SUPPORT BODY [mm] | DISTANCE Lb [mm] | RESULTS OF HIGH PRESSURE WATER DURABILITY TESTS EXCELLENT: NO WATER ENTERING INSIDE POOR: WATER ENTERING INSIDE |
|---|---|---|---|---|---|---|---|
| 1 | 70 | 2.4 | 44.5 | 39.7 | 56 | 5.75 | EXCELLENT |
| 2 | 70 | 2.4 | 44.5 | 39.7 | 58 | 6.75 | EXCELLENT |
| 3 | 70 | 2.4 | 44.5 | 39.7 | 60 | 7.75 | EXCELLENT |
| 4 | 60 | 2.4 | 44.5 | 39.7 | 60 | 7.75 | EXCELLENT |
| 5 | 50 | 2.4 | 44.5 | 39.7 | 60 | 7.75 | EXCELLENT |
| 6 | 70 | 2.4 | 44.5 | 39.7 | 54 | 4.75 | POOR |
| 7 | 70 | 2.4 | 44.5 | 39.7 | 48 | 1.75 | POOR |
| 8 | 60 | 2.4 | 44.5 | 39.7 | 48 | 1.75 | POOR |
| 9 | 50 | 2.4 | 44.5 | 39.7 | 48 | 1.75 | POOR |

VENTILATION UNIT

TECHNICAL FIELD

The present invention relates to a ventilation unit.

BACKGROUND ART

Conventionally, a ventilation component allowing passage of air between the inside and outside of a case in an electrical component, such as a battery pack for a vehicle, has been suggested.

For example, a ventilation component described in Patent Document 1 includes: an explosion-proof valve case formed of a synthetic resin, and forming an annular ring shape; an O-ring sealing between the explosion-proof valve case and a pack case; a circular sheet-like ventilation membrane attached to the case so as to close a central opening of the explosion-proof valve case; and a circular plate-like protector formed of a synthetic resin, and overlapped and arranged outside the ventilation membrane.

CITATION LIST

Patent Literature

Patent Document 1: Japanese Patent Application Laid-Open Publication No. 2013-168293

SUMMARY OF INVENTION

Technical Problem

In a ventilation unit (ventilation component) mounted onto an electrical component of a vehicle, a sealing member, such as an O ring, is provided between a housing of the electrical component and a member supporting a ventilation membrane for preventing water or the like from entering through a gap between the housing of the electrical component and the member supporting the ventilation membrane. However, in car washing operation by high-pressure water jetting, there is a risk of deformation of the sealing member because the sealing member directly gets wet by the high-pressure water. Then, deformation of the sealing member leads to a risk that water or the like enters the inside of the housing.

An object of the present invention is to provide a ventilation unit capable of preventing water or the like from entering the inside of a housing.

Solution to Problem

Under such an object, the present invention provides a ventilation unit (1) including: a ventilation body (10) allowing gas to circulate between outside and inside of a housing (120); a support member (20) supporting the ventilation body (10) and attached to an opening portion (121) formed in the housing (120); and a sealing member (30) disposed between an outer surface (120a) around the opening portion in the housing (120) and the support member (20) to seal a gap between the support member (20) and the housing (120), the ventilation unit (1) being attached to the opening portion (121) of the housing (120) to ventilate between the outside and the inside of the housing (120) through the ventilation body (10), wherein the support member (20) includes an attachment portion (224) to which the sealing member (30) is attached and a wall portion (21) provided around the attachment portion (224), and, in a state where the sealing member (30) is attached between the support member (20) and the housing (120), a distance between the sealing member (30) and an external surface (21a) in the wall portion (21) of the support member (20) is 5.0 mm or more.

Here, a portion (223) in the wall portion (21) of the support member (20) facing the outer surface (120a) of the housing (120) may be parallel to the outer surface (120a), and the external surface (21a) may be perpendicular to the outer surface (120a).

Moreover, in a state where the support member (20) is attached to the opening portion (121) of the housing (120), a distance between a portion (223) in the wall portion (21) facing the outer surface (120a) of the housing (120) and the outer surface (120a) may be 0.05 mm to 2.0 mm.

The sealing member (30) may be in an annular shape, and may have a wire diameter of 2.4 mm.

Moreover, the ventilation unit (1) may further include a ventilation member (250) allowing gas to flow from the inside of the housing (120) to the outside of the housing (120) in a case where an internal pressure, which is a pressure inside the housing (120), is higher than an external pressure, which is a pressure outside the housing (120), by a value not less than a predetermined pressure, and being capable of returning to a state of blocking the flow of the gas in a case where a pressure difference between the internal pressure and the external pressure is less than the predetermined pressure.

Alternatively, the ventilation body (10) may allow gas to circulate between the inside of the housing (120) and the outside of the housing (120) even in the case where the pressure difference between the internal pressure and the external pressure is less than the predetermined pressure.

Note that the above signs in this section are provided for exemplification in describing the present invention, and the present invention is not restricted by these signs.

Advantageous Effects of Invention

According to the present invention, it is possible to provide a ventilation unit capable of preventing water or the like from entering the inside of a housing.

BRIEF DESCRIPTION OF DRAWINGS

FIG. 6 is a diagram showing results of high-pressure water durability tests;

DESCRIPTION OF EMBODIMENTS

Hereinafter, exemplary embodiments according to the present invention will be described in detail with reference to attached drawings.

First Exemplary Embodiment

Figure 1:
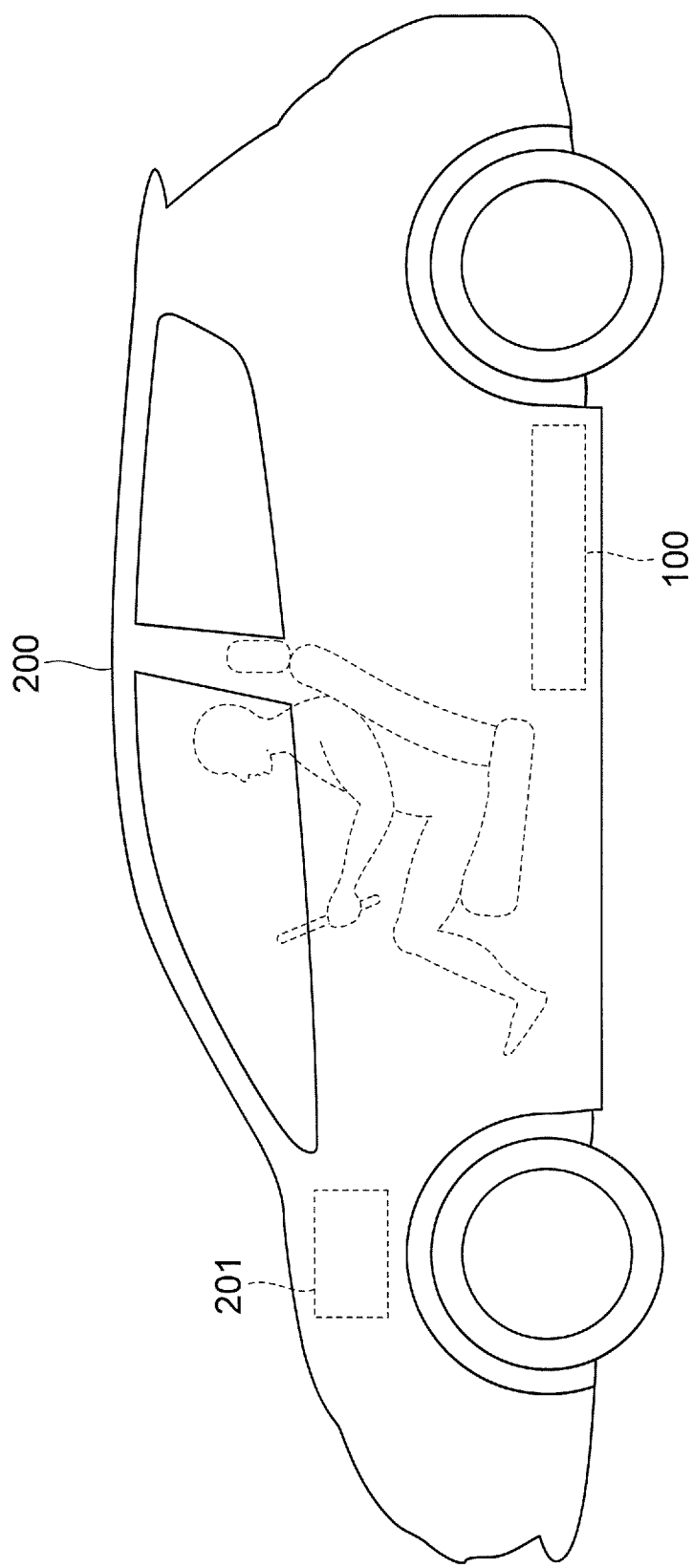
FIG. 1 is a diagram showing a general configuration of a vehicle loaded with a battery pack to which a ventilation unit related to a first exemplary embodiment is applied.

FIG. 1 is a diagram showing a general configuration of a vehicle 200 loaded with a battery pack 100 to which a ventilation unit 1 related to a first exemplary embodiment is applied. FIG. 1 is a side view of the vehicle 200.

Figure 2:
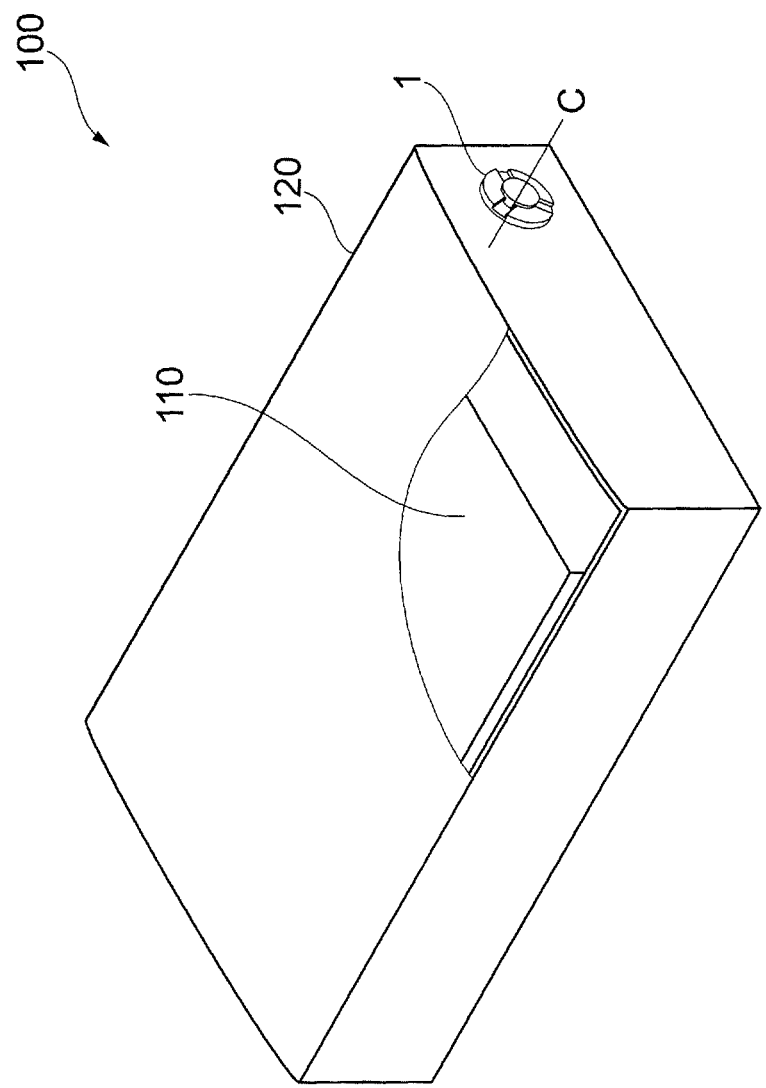
FIG. 2 is a diagram showing a general configuration of the battery pack.

FIG. 2 is a diagram showing a general configuration of the battery pack 100.

The vehicle 200 includes: a motor unit 201 provided to a front portion of a vehicle body; and the battery pack 100 provided to a bottom portion of the vehicle body to supply the motor unit 201 with electric power. The vehicle 200 is an electric vehicle that drives front wheels with a drive force outputted from the motor unit 201.

The battery pack 100 includes: a battery 110; a controller (not shown) for controlling the battery 110; various kinds of sensors (not shown) for detecting the state of the battery 110; and a housing 120 that contains the battery 110 or the controller.

The battery pack 100 also includes a ventilation unit 1 that is attached to the housing 120 to adjust a pressure difference between an internal pressure of the housing 120 and an external pressure of the housing 120. The ventilation unit 1 is attached to the housing 120 so that a direction of a centerline (hereinafter, referred to as a "centerline direction" in some cases) is horizontal to the ground.

[Ventilation Unit 1]

Figure 3:
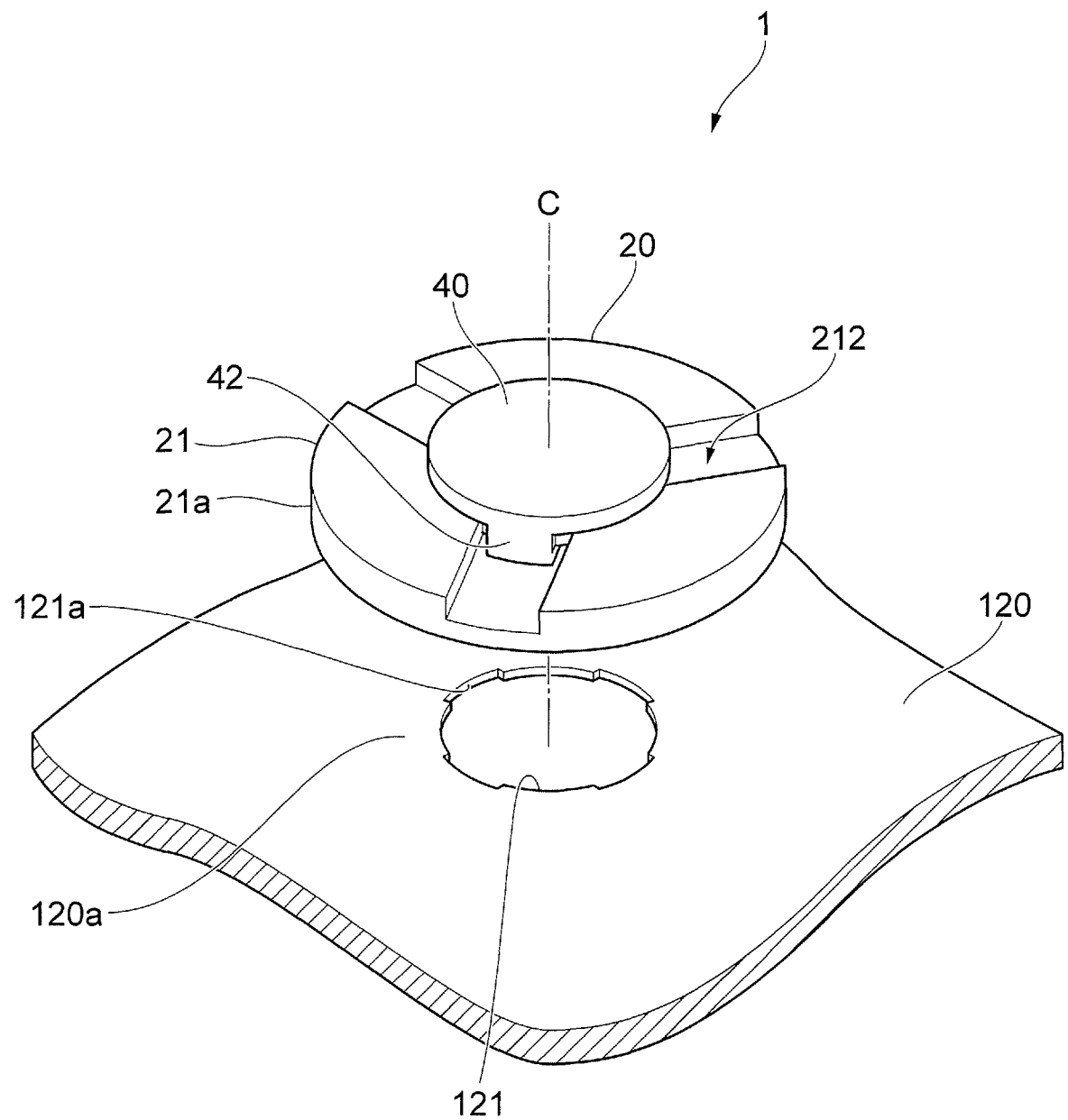
FIG. 3 is a perspective view showing the ventilation unit related to the first exemplary embodiment.
Figure 4:
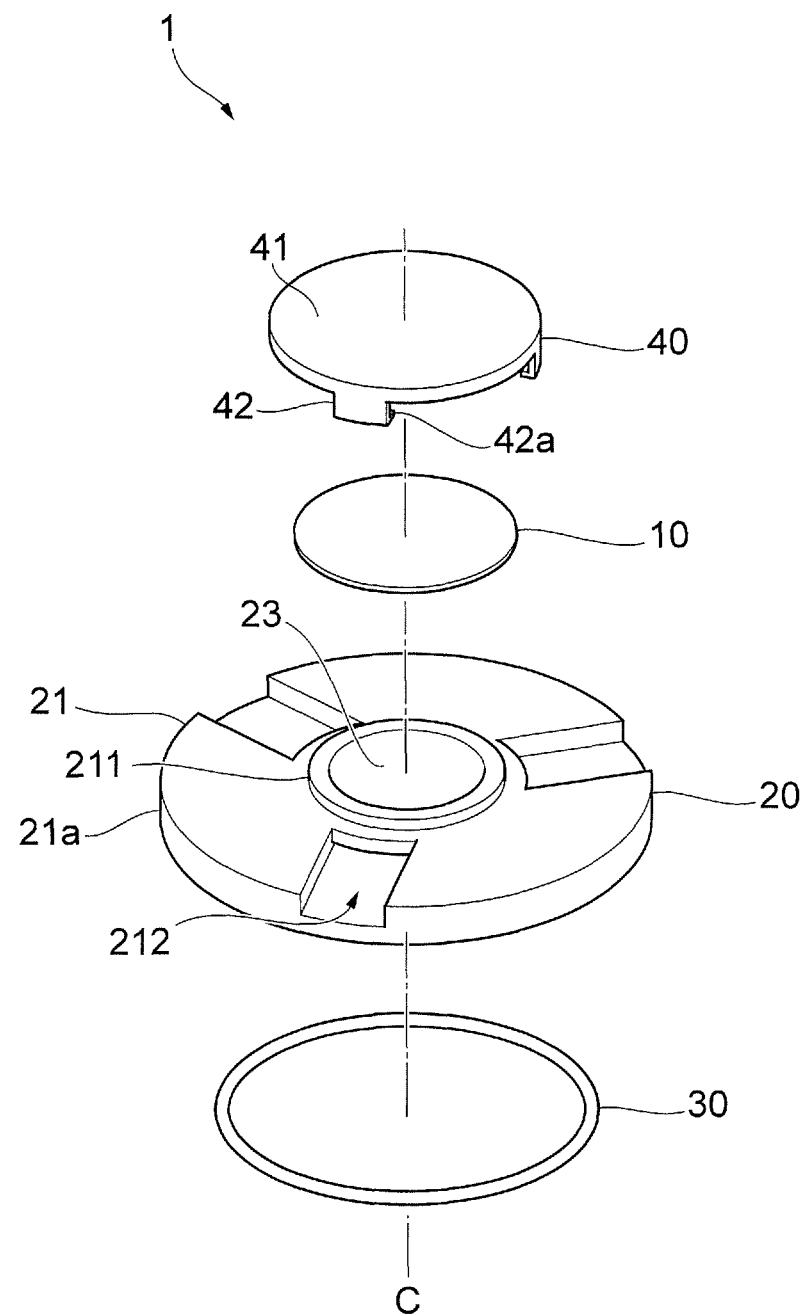
FIG. 4 is a perspective view of components constituting the ventilation unit related to the first exemplary embodiment.
Figure 5:
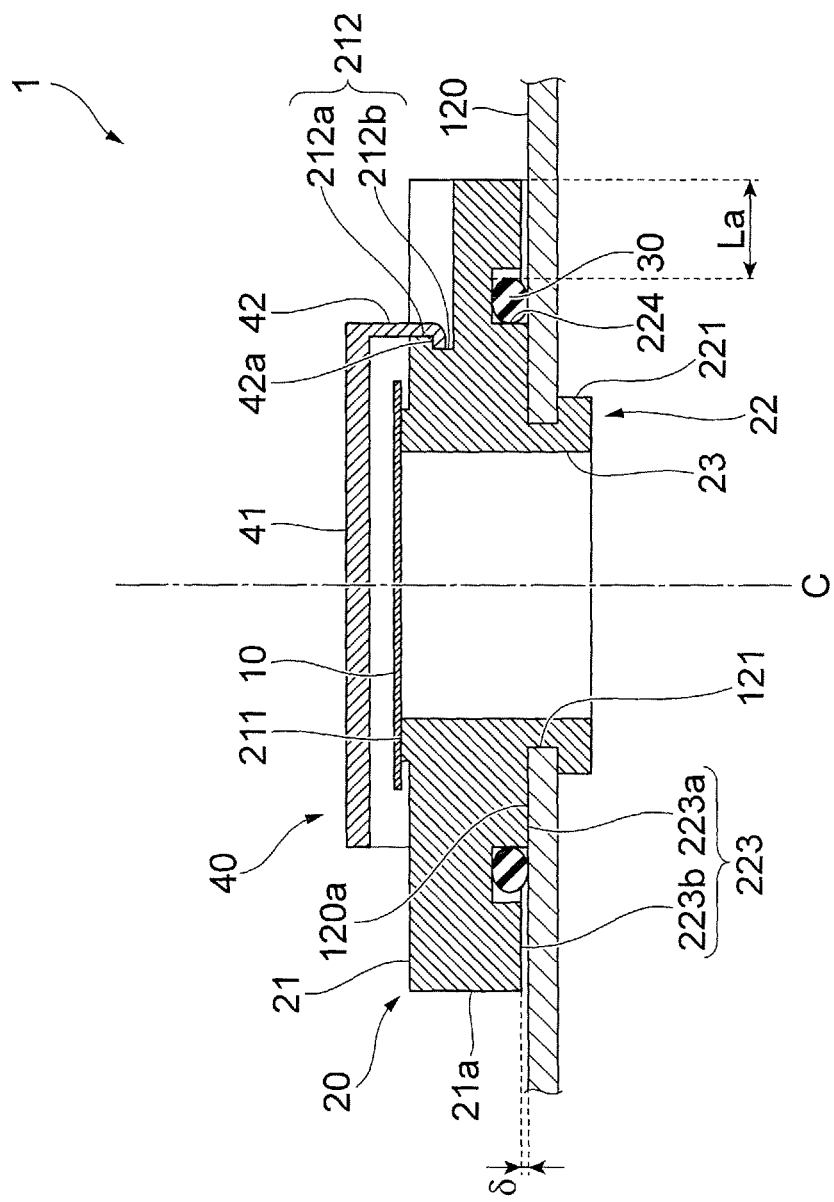
FIG. 5 is a cross-sectional view of the ventilation unit related to the first exemplary embodiment.

FIG. 3 is a perspective view showing the ventilation unit 1 related to the first exemplary embodiment. FIG. 4 is a perspective view of components constituting the ventilation unit 1 related to the first exemplary embodiment. FIG. 5 is a cross-sectional view of the ventilation unit 1 related to the first exemplary embodiment. Hereinafter, the upper side in each of FIGS. 3 to 5 is referred to as "upward," and the lower side thereof is referred to as "downward" in some cases.

The ventilation unit 1 includes a ventilation membrane 10 as an example of a ventilation body allowing gas to circulate between an exterior of a housing 120 (outside) and an interior of the housing 120 (inside). The ventilation unit 1 also includes a support body 20 as an example of a support member supporting the ventilation membrane 10 and attached to an insertion hole 121 as an example of an opening portion formed in the housing 120. The ventilation unit 1 also includes an O ring 30 as an example of a sealing member disposed between an outer surface 120a of the insertion hole 121 in the housing 120 and the support body 20 to seal a gap between the support body 20 and the housing 120. The ventilation unit 1 also includes a cover 40 protecting the ventilation membrane 10 from direct contact with high-pressure water and so forth.

Note that the ventilation unit in the present invention "is attached to an opening portion of the housing to ventilate between the outside and the inside of the housing through the ventilation body," and, since the ventilation unit 1 is attached to the insertion hole 121 of the housing 120 to have a structure in which an only ventilation path connecting the outside and the inside of the housing 120 is covered with the ventilation membrane 10, the ventilation unit 1 provides ventilation between the outside and the inside of the housing through the ventilation membrane 10.

《Support Body 20》

The support body 20 includes a disk-shaped portion 21 having a disk shape and an inserted portion 22 to be inserted into the insertion hole 121 of the housing 120. At the center portion of the support body 20, the communicating hole 23 penetrating through the disk-shaped portion 21 and the inserted portion 22 to communicate one end and the other end of the support body 20 in the centerline direction is formed.

The disk-shaped portion 21 includes a supportive protruding part 211 annularly protruding in a direction different form that of the inserted portion 22 to support the ventilation membrane 10.

The disk-shaped portion 21 also includes, at the upper portion thereof, holders 212 holding a cover 40. The holders 212 are provided at three locations at regular intervals in the circumferential direction. Each holder 212 includes a linear part 212a linearly concaved inward from the outer circumferential surface 21a of the disk-shaped portion 21 and a concave part 212b further concaved from the linear part 212a downward of the linear part 212a. An inward protruding part 42a of an extending portion 42, which will be described later, of the cover 40 is fitted into the concave part 212b, and thereby the support body 20 holds the cover 40.

Note that the support member in the present invention "supports the ventilation body and is attached to the opening portion formed in the housing," and the support member does not have to be a single component, but may be composed of two or more components. The support body 20 is a single component formed by integrating the disk-shaped portion 21 and the inserted portion 22; however, for example, a support body composed of a disk-shaped portion 21 and an inserted portion 22 that have been separated, in other words, two components, can be exemplified. Moreover, a structure protecting the ventilation membrane 10, such as the cover 40, is incorporated into the support body 20 to form a single component as the support member can also be exemplified.

In the disk-shaped portion 21, a facing surface 223 facing an outer surface 120a around the insertion hole 121 of the housing 120 is formed to be parallel with the outer surface 120a. In the exemplary embodiment, the outer surface 120a is a surface perpendicular to the centerline direction, and the facing surface 223 is also a surface perpendicular to the centerline direction.

The disk-shaped portion 21 includes an annular concave portion 224 that is concaved upward from the facing surface 223. The O ring 30 is fitted into the annular concave portion 224. The depth of the annular concave portion 224 is set smaller than the wire diameter of the O ring 30. The width of the annular concave portion 224 (the size of the annular concave portion 224 in the radial direction) is set larger than the wire diameter of the O ring 30.

The facing surface 223 is constituted by an inner facing surface 223a that is a surface positioned on the inner side (closer to the center portion) than the annular concave portion 224 and an outer facing surface 223b that is a surface positioned on the outer side than the annular concave portion 224. In the exemplary embodiment, the outer facing surface 223b is formed above the inner facing surface 223a by a predetermined distance δ. The distance δ can be 0.05 mm to 2.0 mm as an example.

Note that the support member in the present invention "includes: an attachment portion to which the sealing member is to be attached; and a wall portion provided around the attachment portion," however, the attachment portion does not have to be a distinct structure, such as the annular concave portion 224, but may include a portion to which the sealing member can substantially be attached. For example, the wall portion of the inner portion or the wall portion of the outer portion of the annular concave portion 224 should not necessarily be a structure approaching the O ring 30, like the annular concave portion 224. It is preferable that the wall portion of the inner portion or the outer portion approaching the O ring 30 exists to allow the O ring 30 to be easily positioned; however, existence of the wall portion is not essential.

The facing surface 223 and the annular concave portion 224 formed as described above causes the inner facing surface 223a and the outer surface 120a to contact with each other in the state where the support body 20 is attached to the insertion hole 121 of the housing 120, and causes the outer facing surface 223b to form a gap with the outer surface 120a by the distance δ. The O ring 30 is pressed by the surface forming the annular concave portion 224 and the outer surface 120a to be brought into contact with the support body 20 and the outer surface 120a, to thereby seal the gap between the support body 20 and the outer surface 120a.

Note that, in the present invention, it is preferable that, "in the state where the support member is attached to the opening portion of the housing, the distance between the portion in the wall portion facing the outer surface of the housing and the outer surface is 0.05 mm to 2.0 mm," however, the distance between the portion facing the outer surface and the outer surface may be logically determined as a design value based on the size of the inserted portion 22, the hardness of the O ring 30, and so on, without being measured in the state where the support member is actually attached to the opening portion of the housing. Incidentally, an error thereof can be held at 0.5 mm or less. The distance between the portion facing the outer surface and the outer surface is preferably 1.5 mm or less, more preferably 1.0 mm or less, still preferably 0.8 mm or less, most preferably 0.5 mm or less, and preferably 0.1 mm or more.

The outer circumferential surface 21a of the disk-shaped portion 21 includes a surface parallel to the centerline direction. In other words, the outer circumferential surface 21a includes a surface perpendicular to the facing surface 223 and the outer surface 120a.

The inserted portion 22 has a cylindrical shape having an outer diameter substantially the same as the insertion hole 121 formed in the housing 120.

The inserted portion 22 includes, at a tip end portion thereof, which is first inserted into the housing 120, outward protruding parts 221 protruding outward in the radial direction from the external surface. The outward protruding parts 221 are provided at four locations at regular intervals in the circumferential direction. In a state where the outward protruding parts 221 of the inserted portion 22 are positioned to face cutouts 121a formed in the housing 120, the inserted portion 22 is inserted into the insertion hole 121 formed in the housing 120 and then rotated around the centerline C at the position where the outward protruding parts 221 enter the housing 120, and thereby the support body 20 is fitted into the housing 120. Consequently, the ventilation unit 1 is attached to the housing 120. The outward protruding parts 221 of the inserted portion 22 positioned below the insertion hole 121 formed in the housing 120 and butting against the surface inside the housing 120 prevent the support body 20 from being detached from the housing 120.

As the material of the support body 20, though not particularly limited, a thermoplastic resin, which is easily molded, is preferred. As the thermoplastic resin, examples of thermoplastic resins except for elastomer can include polybutylene terephthalate (PBT), polyethylene terephthalate (PET), polyphenylene sulfide (PPS), polysulfone (PS), polypropylene (PP), polyethylene (PE), ABS resin or a composite material thereof. Other than these, the examples of the material of the support body 20 can include a composite material made by combining a reinforcement, such as glass fiber or carbon fiber, or metal with the thermoplastic resin to improve heat resistance, humidity resistance, dimensional stability, rigidity, or the like.

The molding method of the support body 20 is not particularly limited; examples thereof can include injection molding, compression molding or cutting.

«Ventilation Membrane 10»

The ventilation membrane 10 is formed into a disk shape. The outer diameter of the ventilation membrane 10 is larger than the outer diameter of the supportive protruding part 211 of the disk-shaped portion 21 in the support body 20. The ventilation membrane 10 is supported by the supportive protruding part 211 to cover the communicating hole 23. Examples of the supporting method can include joining by welding the ventilation membrane 10 to the supportive protruding part 211. Other than this, ventilation membrane 10 and the supportive protruding part 211 may be bonded by a bonding agent or a double-faced tape. Moreover, the ventilation membrane 10 and the support body 20 may be integrated by insert molding. Alternatively, the ventilation membrane 10 may be swaged to the support body 20.

The material, the structure, and the form of the ventilation membrane 10 are not particularly limited as long as a sufficient air permeable amount can be secured. Examples of the ventilation membrane 10 can include at least a kind selected from a fluorine resin porous body and a polyolefine porous body. As the fluorine resin, polytetrafluoroethylene (PTFE), polychlorotrifluoroethylene, tetrafluoroethylene-hexafluoropropylene copolymer, tetrafluoroethylene-perfluoroalkyl vinyl ether copolymer, tetrafluoroethylene-ethylene copolymer and so forth can be taken as examples. Examples of polyolefine monomers can include: ethylene; propylene; 4-methylpentene-1; and 1-butene, and polyolefine obtained by homopolymerizing or copolymerizing these monomers can be used. Moreover, the material may be obtained by blending at least two kinds of polyolefine, or may be a layer structure of at least two kinds of polyolefine. Of these, it is particularly preferable that the ventilation membrane 10 is made of a PTFE porous body that is able to maintain ventilating properties even with a small area and is highly functional to prevent entry of water or dust into the inside of the housing 120.

Note that a reinforcing material may be laminated to form a layer on at least one surface of the ventilation membrane 10. The material, the structure and the form of the reinforcing material are not particularly limited; however, a material having pore diameters larger than those of the ventilation membrane 10 and good ventilating properties, such as a woven cloth, a non-woven cloth, a mesh, a net, a sponge, a foam, a metal porous body or a metal mesh is suitable. When heat resistance is required, the reinforcing material made of polyester, polyamide, aramid resin, polyimide, fluoride resin, ultrahigh molecular weight polyethylene, metal or the like is preferred.

«O Ring 30»

The O ring 30 is an annular-shaped member with a circular cross section cut by a plane passing through the centerline C. The diameter of the circle of the cross section (the wire diameter) can be 2.4 mm as an example. The inner diameter and the outer diameter of the O ring 30 are 39.7 mm and 44.5 mm, respectively, as an example. The hardness as the material of the O ring 30 (specified in Japanese Industrial Standard (JIS) K6253:2012, the type A durometer) is A50 to A70 as an example. The material of the O ring 30 is a synthetic rubber or an elastic material similar thereto. Examples of the synthetic rubber can include polybutadiene series, nitrile series, chloroprene series, and silicone series.

Note that, in the case where the sealing member is an O ring, the wire diameter of the O ring is normally 0.5 mm to 5.0 mm, preferably 1.0 mm or more, more preferably 1.2 mm or more, still preferably 1.4 mm or more, especially preferably 1.6 mm or more, and preferably 4.0 mm or less, more preferably 3.5 mm or less, and especially preferably 3.0 mm or less.

Moreover, the hardness as the material of the O ring (specified in Japanese Industrial Standard (JIS) K6253: 2012) is normally A20 to A90, preferably A30 or more, more preferably A40 or more, still preferably A 50 or more, and preferably A80 or less.

«Cover 40»

The cover 40 includes a disk-shaped top portion 41 and the extending portions 42 extending from an outermost circumferential part in the top portion 41 toward the support body 20.

The outer diameter of the top portion 41 is larger than the outer diameter of the ventilation membrane 10, and the top portion 41 covers the ventilation membrane 10 at a position with a predetermined interval from the ventilation membrane 10.

The extending portions 42 are formed at three locations at regular intervals in the circumferential direction. The extending portion 42 includes, at the end portion thereof on the support body 20 side, the inward protruding part 42a that protrudes inwardly. The inward protruding parts 42a are fitted into the concave parts 212b formed in the disk-shaped portion 21 of the support body 20, and thereby the cover 40 is held by the support body 20. Gaps between the extending portions 42 function as a part of the flow path of gases circulating between the inside of the housing 120 and the outside of the housing 120.

The cover 40 is made of the same material as the support body 20, as an example.

Note that the method of integrating the cover 40 and the support body 20 is not limited to the above-described method that fits the inward protruding parts 42a of the cover 40 into the concave parts 212b formed in the support body 20. For example, the cover 40 and the support body 20 may be integrated by thermal welding, ultrasonic welding, oscillatory welding, bonding using a bonding agent, threading, or the like.

By covering the ventilation membrane 10 with the cover 40, the ventilation membrane 10 is prevented from being damaged by external forces, or ventilation is prevented from being blocked due to sand, mud and so forth piled on the surface of the ventilation membrane 10.

«Size of Outer Circumferential Surface 21a of Disk-Shaped Portion 21 in Support Body 20»

In the ventilation unit 1 configured as described above, the size of the outer circumferential surface 21a of the disk-shaped portion 21 in the support body 20 is set so that the distance La between the O ring 30 and the outer circumferential surface 21a in the state where the support body 20 is attached to the insertion hole 121 of the housing 120 is 5.0 mm or more. This aims to prevent water or the like from entering the inside of the housing 120 through the gap between the disk-shaped portion 21 in the support body 20 and the outer surface 120a of the housing 120.

FIG. 6 is a diagram showing results of high-pressure water durability tests.

The high-pressure water durability tests on the ventilation unit 1 were performed in the state where the ventilation unit 1 was attached to the housing 120, in accordance with the IPX9K test based on Japanese Industrial Standard (JIS) D5020:2016, and under the condition of the water temperature of 25° C. Then, it was determined whether the water entered the inside of the housing 120 or the water did not enter the inside of the housing 120; the case in which the water entered was determined to be poor, and the case in which the water did not enter was determined to be excellent.

For the O ring 30, three types of O rings manufactured by KYOWA SEAL Co., Ltd. were used, the O rings being made of silicone material, having the inner diameter of 39.7 mm, the outer diameter of 44.5 mm and the wire diameter of 2.4 mm, and different hardnesses. As the three kinds of different hardnesses, 70°, 60°, and 50° by the type A durometer were employed. In addition, as the samples of the support body 20, five types of support bodies with different diameters (outer diameters) of the outer circumferential surface 21a of the disk-shaped portion 21 were used. As the five types, the different diameters of the outer circumferential surface 21a were 48 mm, 54 mm, 56 mm, 58 mm, and 60 mm. In the case where the different diameters of the outer circumferential surface 21a, 48 mm, 54 mm, 56 mm, 58 mm and 60 mm were employed, the distances Lb between the outer circumferential surface 21a of the disk-shaped portion 21 in the support body 20 and the O ring 30 before attaching the support body 20 to the insertion hole 121 of the housing 120 were 1.75 mm, 4.75 mm, 5.75 mm, 6.75 mm and 7.75 mm, respectively.

(1) Sample Nos. 1, 2, 3, 6, and 7 are different only in the diameter of the outer circumferential surface 21a of the disk-shaped portion 21 in the support body 20, and have the distances Lb of 5.75 mm, 6.75 mm, 7.75 mm, 4.75 mm, and 1.75 mm, respectively. In the case where the distances Lb were 5.75 mm, 6.75 mm and 7.75 mm, the results of the high-pressure water durability tests were such that the water did not enter the inside of the housing 120 and the samples were determined to be excellent as shown in FIG. 6. On the other hand, as shown in FIG. 6, in the case where the distances Lb were 4.75 mm and 1.75 mm, the water entered the inside of the housing 120 and the samples were determined to be poor.

(2) Sample Nos. 3, 4, and 5 have the same diameter, 60 mm, of the outer circumferential surface 21a of the disk-shaped portion 21 in the support body 20, and have the O ring in the same shape, but differ only in the hardnesses of 70°, 60°, and 50°, respectively, of the O ring 30. The results of the high-pressure water durability tests were such that, as shown in FIG. 6, the water did not enter the inside of the housing 120 and the determination was excellent in all samples.

(3) Sample Nos. 7, 8, and 9 have the same diameter, 48 mm, of the outer circumferential surface 21a of the disk-shaped portion 21 in the support body 20, and have the O ring 30 in the same shape, but differ only in the hardnesses of 70°, 60°, and 50°, respectively, of the O ring 30. The results of the high-pressure water durability tests were such that, as shown in FIG. 6, the water entered the inside of the housing 120 and the determination was poor in all samples.

From (1) described above, in the case where the distance Lb before attaching the support body 20 to the insertion hole 121 of the housing 120 is 5.75 mm or more, the sample is determined to be excellent, whereas, in the case where the distance Lb is 4.75 mm or less, the sample is determined to be poor. In the case where the distance Lb is 5.75 mm, it can be considered that the distance La in the state where the support body 20 is attached to the insertion hole 121 of the housing 120 is 5.0 mm; therefore, it is considered that the water does not enter the inside of the housing 120 in the case where the distance La is 5.0 mm or more.

Then, from (2) and (3) described above, it can be learned that the same shapes of the support body 20 and the same shapes of the O ring 30 do not change the results of determination even though the hardnesses of the O ring 30 are different.

In view of the results of high-pressure water durability tests shown in FIG. 6, in the ventilation unit 1 related to the exemplary embodiment, the distance La between the O ring 30 and the outer circumferential surface 21a of the disk-shaped portion 21 in the support body 20 in the state where the support body 20 is attached to the insertion hole 121 of the housing 120 is set at 5.0 mm or more. This prevents the water or the like from entering the inside of the housing 120 as shown in the results of the tests in FIG. 6.

Note that, in the present invention, it is described that, "in the state where the sealing member is attached between the support member and the housing, the distance between the sealing member and the external surface in the wall portion of the support member is 5.0 mm or more," however, the distance between the sealing member and the external surface in the wall portion may be logically determined as a design value based on the size of the annular concave portion 224, the O ring 30, and the support body 20 without being measured in the state where the sealing member is actually attached to the opening portion of the housing. Incidentally, in the case where the position of the O ring has a degree of freedom, the distance is grasped upon prediction of variations in the diameter of the O ring 30 when the centers of the support body 20 and the O ring 30 in a planar view are matched and the O ring 30 is compressed. For example, in the case of the O ring having the wire diameter of 2.4 mm, the width thereof is about 2.8 mm at the compression rate of about 20%; therefore, in consideration of the value, the distance between the sealing member and the external surface in the wall portion may be determined. The distance between the sealing member and the external surface is preferably 5.2 mm or more, more preferably 5.5 mm or more, still preferably 5.7 mm or more, especially preferably 6.5 mm or more, and most preferably 7.5 mm; and normally 20 mm or less, preferably 15 mm or less, still preferably 12 mm or less, and especially preferably 10 mm or less.

As described above, the ventilation unit 1 related to the first exemplary embodiment includes: the ventilation membrane 10 as an example of the ventilation body allowing gases to circulate between the outside and inside of the housing 120; and the support body 20 as an example of the support member supporting the ventilation membrane 10 and attached to the insertion hole 121 as an example of the opening portion formed in the housing 120. The ventilation unit 1 also includes the O ring 30 as an example of the sealing member disposed between the outer surface 120a of the insertion hole 121 in the housing 120 and the support body 20 to seal the gap between the support body 20 and the housing 120. The support body 20 includes: the annular concave portion 224 as an example of the attachment portion to which the O ring 30 is to be attached; and the disk-shaped portion 21 as an example of the wall portion provided around the annular concave portion 224. Then, in the state where the O ring 30 is attached between the support body 20 and the housing 120, the distance La between the O ring 30 and the outer circumferential surface 21a as an example of the external surface of the disk-shaped portion 21 in the support body 20 is 5.0 mm or more.

In the ventilation unit 1 related to the first exemplary embodiment configured as described above, in the case where a pressure difference is generated between the pressure inside the housing 120 (internal pressure) and the pressure outside the housing 120 (external pressure), the pressure difference is eliminated by allowing gases to circulate between the inside of the housing 120 and the outside of the housing 120 via the ventilation membrane 10. In other words, through the flow paths configured with the communicating hole 23 formed in the support body 20 or the gaps between the extending portions 42 of the cover 40, gases circulate between the inside of the housing 120 and the outside of the housing 120. In the case where the pressure difference is generated between the internal pressure and the external pressure, the pressure difference is eliminated by allowing the gases to circulate through the flow path via the ventilation membrane 10. As shown in the test results in FIG. 6, the ventilation unit 1 prevents water or the like from entering the inside of the housing 120 through the gap between the disk-shaped portion 21 in the support body 20 and the outer surface 120a of the housing 120. That is, according to the ventilation unit 1, even in the car washing operation by high-pressure water jetting, the O ring 30 hardly gets wet directly by the high-pressure water, and therefore, deformation of the O ring 30 can be prevented. As a result, entrance of the water or the like into the housing 120 due to deformation of the O ring 30 can be prevented.

From another standpoint, in the ventilation unit 1, the O ring 30 is an annular-shaped member having a circular cross section cut by a plane passing through the centerline C, and, in the state where the O ring 30 is attached between the support body 20 and the housing 120, the distance La between the O ring 30 and the outer circumferential surface 21a of the disk-shaped portion 21 in the support body 20 is 2.1 times or more the wire diameter of the O ring 30, which is the diameter of the cross section of the O ring 30. For example, in the case where the wire diameter of the O ring 30 is 2.4 mm, the distance La is 5.0 mm or more.

Moreover, in the ventilation unit 1, the facing surface 223 that is an example of the portion in the disk-shaped portion 21 of the support body 20 facing the outer surface 120a of the housing 120 is in parallel to the outer surface 120a, and the outer circumferential surface 21a of the disk-shaped portion 21 is perpendicular to the outer surface 120a. As compared to, for example, a case in which the facing surface 223 and the outer surface 120a are not in parallel with each other and are inclined so that the gap between the facing surface 223 and the outer surface 120a is larger on the outside than on the inside, due to the facing surface 223 and the outer surface 120a in parallel with each other, the O ring 30 hardly gets wet directly by the high-pressure water;

therefore, deformation of the O ring 30 can be suppressed. In addition, as compared to, for example, a case in which the outer circumferential surface 21a is inclined to the outer surface 120a positioned on the inner side of the outer circumferential surface 21a so that the outer circumferential surface 21a and the outer surface 21a form an obtuse angle, due to the outer circumferential surface 21a and the outer surface 120a perpendicular to each other, the O ring 30 hardly gets wet directly by the high-pressure water; therefore, deformation of the O ring 30 can be suppressed.

In the ventilation unit 1, in the state where the support body 20 is attached to the insertion hole 121 of the housing 120, the distance δ between the outer facing surface 223b of the support body 20 and the outer surface 120a of the housing 120 is 0.05 mm to 2.0 mm. Consequently, as compared to the case in which the distance δ is more than 2.0 mm, the O ring 30 hardly gets wet directly by the high-pressure water; therefore, deformation of the O ring 30 can be suppressed.

Note that, in the ventilation unit 1 related to the above-described first exemplary embodiment, the inserted portion 22 of the support body 20 is inserted into the insertion hole 121 of the housing 120 and the outward protruding part 221 of the inserted portion 22 butts against the surface inside the housing 120; therefore the support body 20 is prevented from being detached from the housing 120. However, the method of attaching the ventilation unit 1 to the housing 120 is not particularly limited. For example, the support body 20 may be press-fitted into the housing 120. Moreover, for example, a male thread may be formed, instead of providing the outward protruding part 221, on the outer circumferential surface of the cylindrical inserted portion 22 to be screwed into a female thread formed in the housing 120 or a female thread of a nut fastened in the housing 120, to thereby attach the ventilation unit 1 to the housing 120.

The O ring 30 has the circular cross section cut by a plane passing through the centerline C, but the cross section is not limited to the circular shape. The cross section of the O ring 30 may have a rectangular shape or an X shape. In such cases, in setting the distance La between the O ring 30 and the outer circumferential surface 21a of the support body 20 in the state where the support body 20 is attached to the housing 120 at 5.0 mm or more, the outermost portion of the O ring 30 may serve as a reference.

Second Exemplary Embodiment

Figure 7:
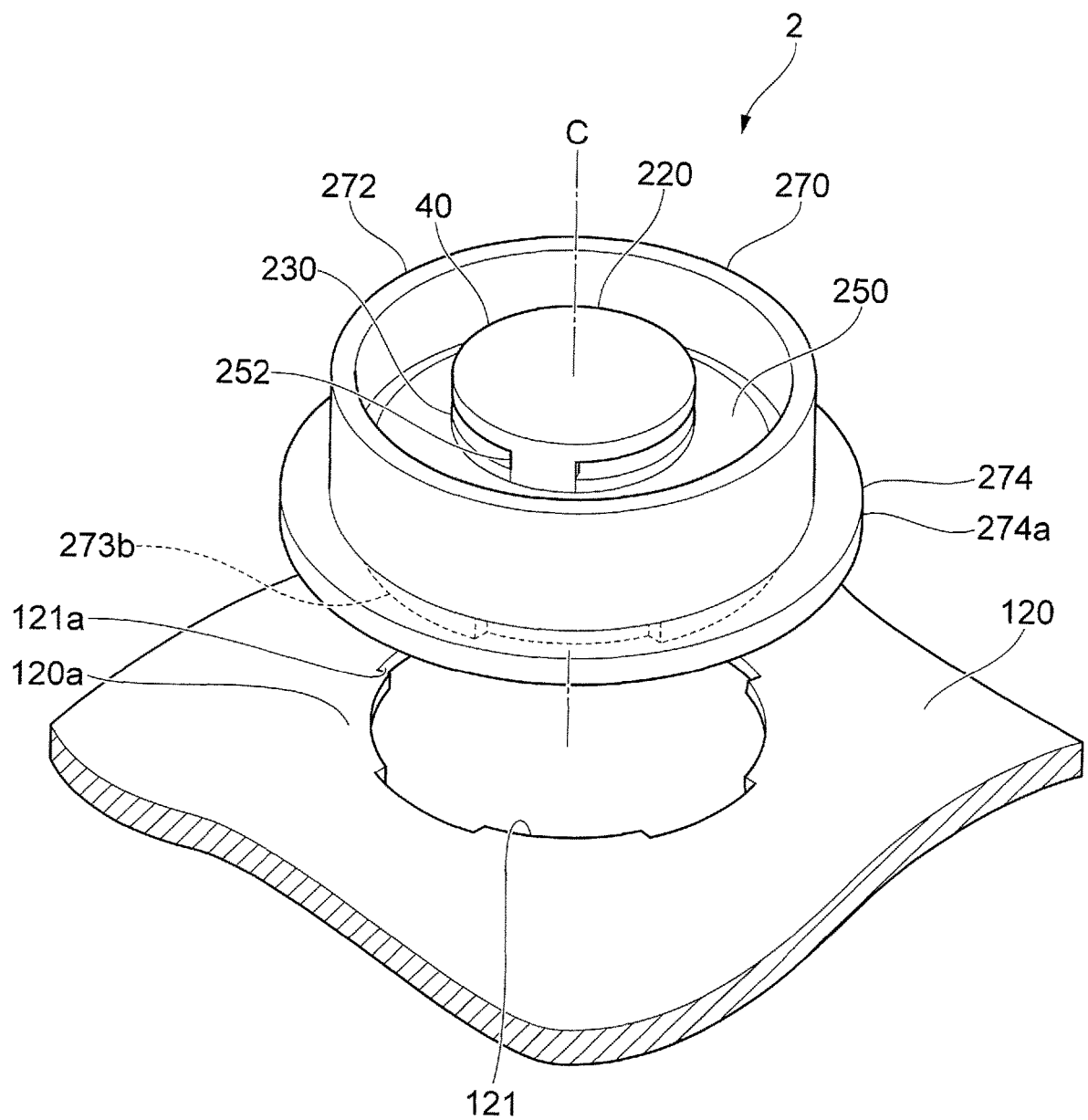
FIG. 7 is a perspective view showing a ventilation unit related to a second exemplary embodiment.
Figure 8:
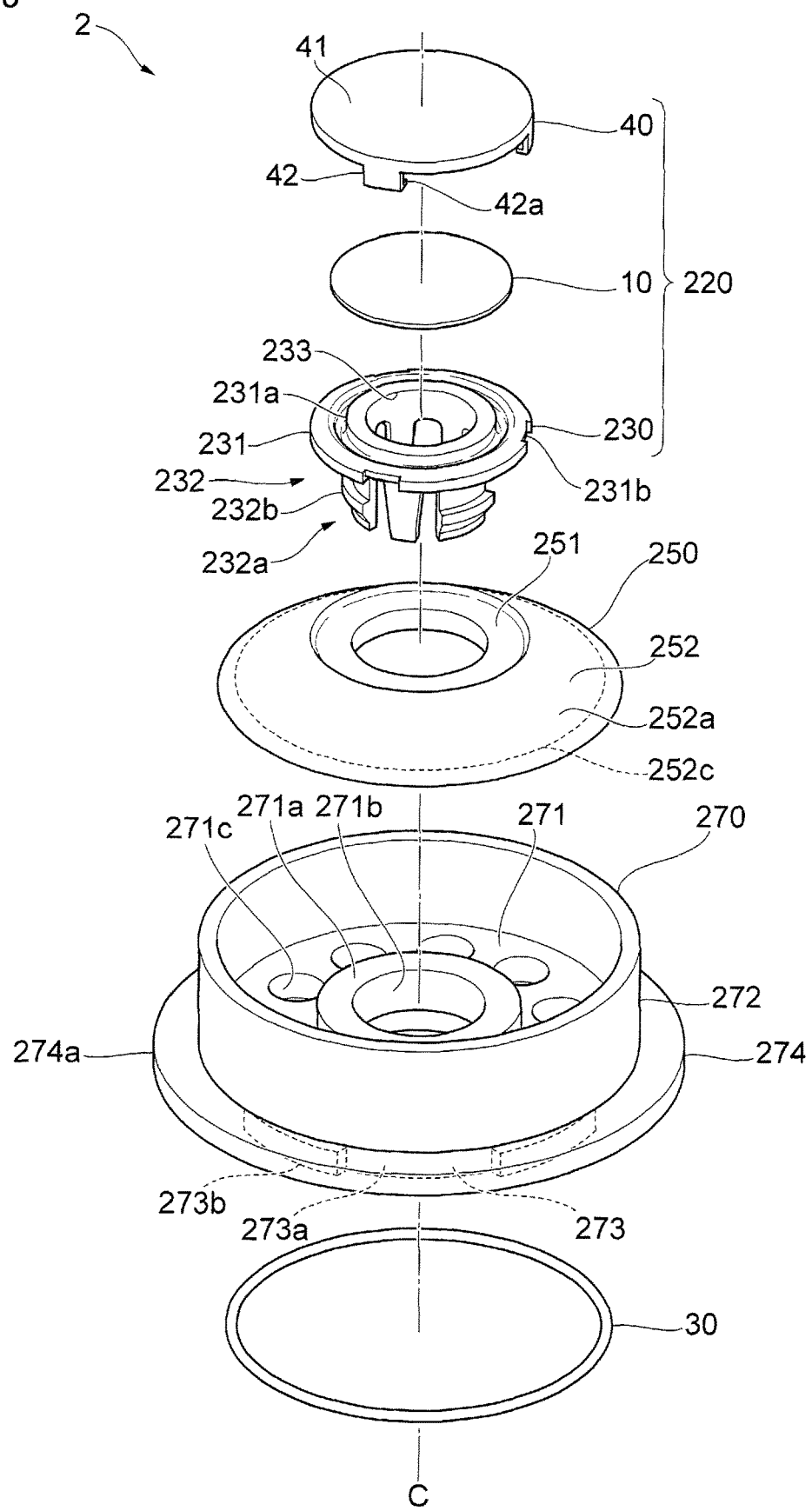
FIG. 8 is a perspective view of components constituting the ventilation unit related to the second exemplary embodiment.
Figure 9:
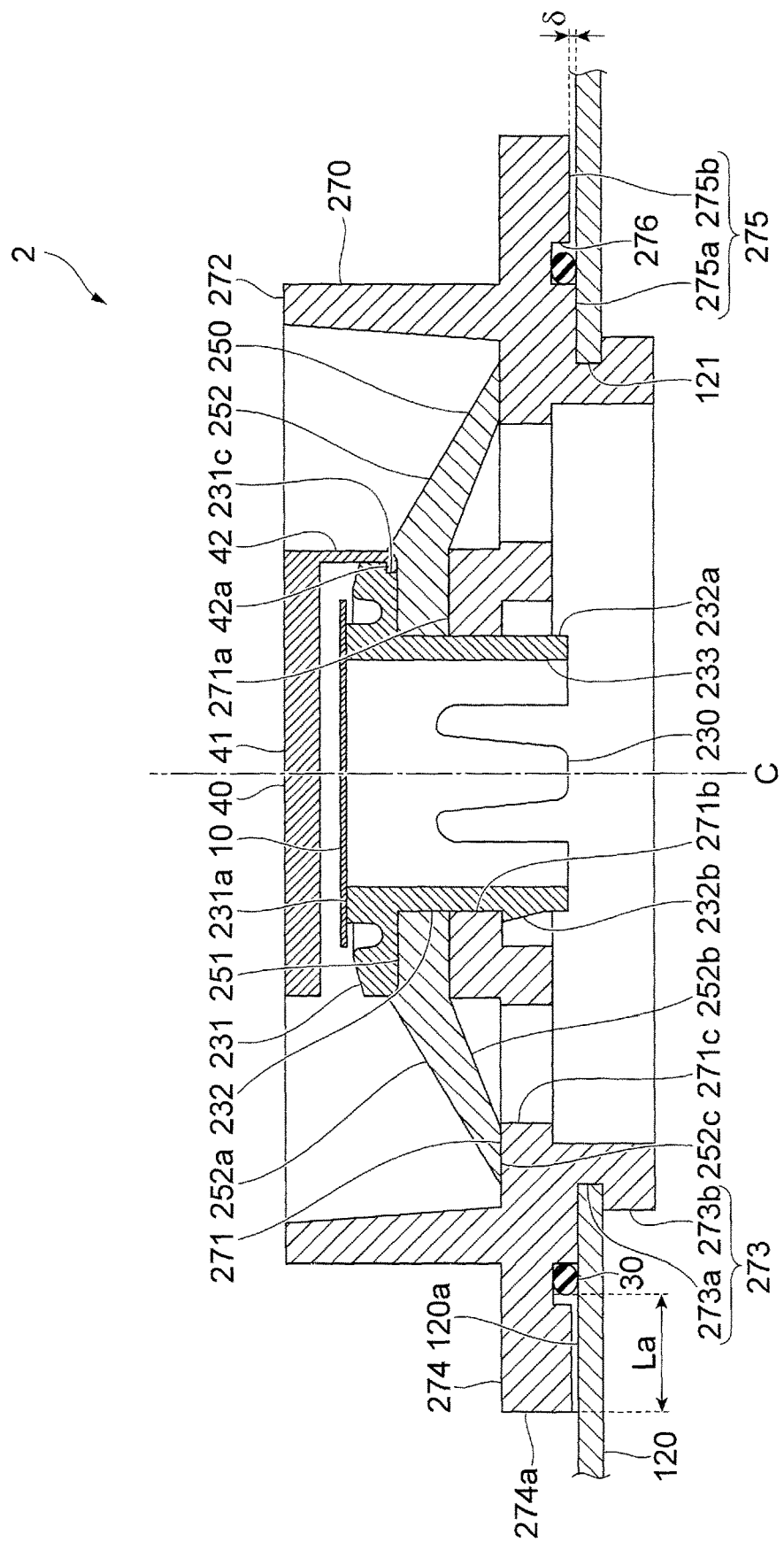
FIG. 9 is a cross-sectional view of the ventilation unit related to the second exemplary embodiment.

FIG. 7 is a perspective view showing a ventilation unit 2 related to the second exemplary embodiment. FIG. 8 is a perspective view of components constituting the ventilation unit 2 related to the second exemplary embodiment. FIG. 9 is a cross-sectional view of the ventilation unit 2 related to the second exemplary embodiment.

The ventilation unit 2 related to the second exemplary embodiment is different from the ventilation unit 1 related to the first exemplary embodiment in the point of including an explosion-proof valve 250 and a holding member 270. Hereinafter, with respect to the ventilation unit 2 related to the second exemplary embodiment, points different from those of the ventilation unit 1 related to the first exemplary embodiment will be described, but points same as those of the ventilation unit 1 related to the first exemplary embodiment will be assigned with the same signs and detailed description thereof will be omitted.

The ventilation unit 2 includes, as an example of a first ventilation body, an explosion-proof valve 250 that allows gas to flow from the inside of the housing 120 to the outside of the housing 120 when internal pressure, which is the pressure inside the housing 120, is higher than pressure outside the housing 120 (external pressure) by a value not less than a predetermined value, and blocks the flow of the gas from the inside of the housing 120 to the outside of the housing 120 when the internal pressure is not higher than the external pressure by a value not less than the predetermined value.

Moreover, the ventilation unit 2 includes an internal pressure adjusting component 220 that allows gas to circulate between the inside of the housing 120 and the outside of the housing 120 when the pressure difference between the internal pressure and the external pressure is less than the predetermined value.

The ventilation unit 2 also includes: the holding member 270 holding the internal pressure adjusting component 220 and attached to the housing 120; and the O ring 30 disposed between the holding member 270 and the housing 120 to seal the holding member 270 and the housing 120.

(Internal Pressure Adjusting Component 220)

The internal pressure adjusting component 220 includes a support body 230 which is attached to the holding member 270 and on which a communicating hole 233 for communicating the inside of the housing 120 with the outside of the housing 120 is formed.

The internal pressure adjusting component 220 also includes the ventilation membrane 10 attached to the support body 230 to cover the communicating hole 233. The ventilation membrane 10 allows gas to circulate between the inside of the housing 120 and the outside of the housing 120 in the case where the pressure difference between the internal pressure and the external pressure is less than the predetermined value.

The internal pressure adjusting component 220 also includes a cover 40 protecting the ventilation membrane 10 from direct contact with high-pressure water and so forth.

«Support Body 230»

The support body 230 includes a support portion 231 for supporting the ventilation membrane 10 and an inserted portion 232 to be inserted into the holding member 270. At the center portion of the support body 230, the communicating hole 233 configured with a through hole that penetrates through the support portion 231 and the inserted portion 232 is formed.

The support portion 231 is a disk-shaped portion at a center portion of which the communicating hole 233 is formed. The outer diameter of the support portion 231 is larger than the outer diameter of the inserted portion 232. The support portion 231 includes, around the communicating hole 233, an annular-shaped supportive protruding part 231a protruding in a direction different form that of the inserted portion 232.

On an outer circumferential portion in the support portion 231, three linear parts 231b are provided at regular intervals in the circumferential direction. At a lower end portion of each of the linear parts 231b, a concave part 231c that is inwardly concaved is formed. An inward protruding part 42a of the extending portion 42 of the cover 40 is fitted into the concave part 231c, and thereby the support body 230 holds the cover 40.

The inserted portion 232 has a cylindrical shape having an outer diameter substantially the same as a center portion through hole 271b, which will be described later, formed in the holding member 270.

The inserted portion 232 includes, at a tip end portion thereof, which is first inserted into the holding member 270, six leg portions 232a divided along the circumferential direction. Each of three leg portion 232a, of the six leg portions 232a, has an outward protruding part 232b protruding outwardly in the radial direction from the external surface. The outward protruding parts 232b of the leg portions 232a are positioned below the center portion through hole 271b formed in the holding member 270 and butt against a bottom portion 271, which will be described later, of the holding member 270, and thereby the support body 230 is prevented from being detached from the holding member 270.

The material and forming method of the support body 230 can be the same as those of the support body 20 related to the first exemplary embodiment as an example.
(Holding Member 270)

The holding member 270 includes: a disk-shaped bottom portion 271; a side portion 272 protruding upwardly in the centerline direction from the bottom portion 271 to be provided in the side direction of the ventilation membrane 10 and the cover 40 of the internal pressure adjusting component 220; and an attaching portion 273 protruding downwardly in the centerline direction from the bottom portion 271 to be attached to the housing 120. The holding member 270 also includes an outward protruding part 274 outwardly protruding in a direction orthogonal to the centerline direction from a lower portion of the side portion 272.

The bottom portion 271 includes, at the center portion thereof, a central protruding part 271a protruding upwardly in the centerline direction. At the center of the central protruding part 271a, the center portion through hole 271b, which is a through hole for holding the internal pressure adjusting component 220, is formed. The leg portions 232a of the inserted portion 232 in the support body 230 of the internal pressure adjusting component 220 are inserted into the center portion through hole 271b, and the plural outward protruding parts 232b of the leg portions 232a are spread out of the hole diameter of the center portion through hole 271b below the center portion through hole 271b, and accordingly, the internal pressure adjusting component 220 is prevented from being detached from the holding member 270.

Moreover, in the bottom portion 271, plural through holes are formed around the central protruding part 271a. Hereinafter, the through holes formed around the central protruding part 271a are referred to as surrounding through holes 271c.

The side portion 272 is provided cylindrically to cover the ventilation membrane 10 of the internal pressure adjusting component 220 or the outer circumferential portion of the cover 40. An upper end surface of the side portion 272 functions as a butting surface of a jig that inserts the internal pressure adjusting component 220 when the internal pressure adjusting component 220 is attached to the holding member 270. Therefore, the position of the upper end surface of the side portion 272 in the centerline direction is same as the position of the upper end surface of the cover 40 of the internal pressure adjusting component 220.

The attaching portion 273 includes a cylindrical part 273a in a cylinder shape and protruding parts 273b protruding outwardly from an outer circumferential surface of the cylindrical part 273a. The protruding parts 273b are formed at four locations at regular intervals in the circumferential direction at the lower end portion of the cylindrical part 273a.

In a state where the protruding parts 273b of the attaching portion 273 are positioned to face cutouts 121a formed in the housing 120, the cylindrical part 273a is inserted into an insertion hole 121 formed in the housing 120 and then rotated around the centerline at the positions where the protruding parts 273b entered the housing 120, and thereby the holding member 270 is fitted into the housing 120. Consequently, the ventilation unit 2 is attached to the housing 120.

The outward protruding part 274 has a cylindrical shape. An outer circumferential surface 274a of the outward protruding part 274 is in parallel with the centerline direction, and is perpendicular to the outer surface 120a around the insertion hole 121 of the housing 120.

In the outward protruding part 274 and the bottom portion 271, a facing surface 275 facing the outer surface 120a around the insertion hole 121 of the housing 120 is formed to be parallel with the outer surface 120a.

In the exemplary embodiment, the outer surface 120a is perpendicular to the centerline direction, and the facing surface 275 is also perpendicular to the centerline direction.

The holding member 270 includes an annular concave portion 276 that is concaved upward from the facing surface 275. The O ring 30 is fitted into the annular concave portion 276. The depth of the annular concave portion 276 is set smaller than the wire diameter of the O ring 30. The width of the annular concave portion 276 is set larger than the wire diameter of the O ring 30.

The facing surface 275 is constituted by an inner facing surface 275a that is a surface positioned on the inner side (closer to the center portion) than the annular concave portion 276 and an outer facing surface 275b that is a surface positioned on the outer side than the annular concave portion 276. In the exemplary embodiment, the outer facing surface 275b is formed above the inner facing surface 275a by a predetermined distance δ. The distance δ can be 0.05 mm to 2.0 mm as an example.

The facing surface 275 and the annular concave portion 276 formed as described above cause the inner facing surface 275a and the outer surface 120a to contact with each other in the state where the holding member 270 is attached to the insertion hole 121 of the housing 120, and cause the outer facing surface 275b to form a gap with the outer surface 120a by the distance δ. The O ring 30 is pressed by the surface forming the annular concave portion 276 and the outer surface 120a to be brought into contact with the holding member 270 and the outer surface 120a, to thereby seal the gap between the holding member 270 and the outer surface 120a.

In the ventilation unit 2, the size of the outer circumferential surface 274a of the outward protruding part 274 in the holding member 270 is set so that the distance La between the O ring 30 and the outer circumferential surface 274a in the state where the holding member 270 is attached to the insertion hole 121 of the housing 120 is 5.0 mm or more. This aims to prevent water or the like from entering the inside of the housing 120 through the gap between the holding member 270 and the outer surface 120a of the housing 120.

The material of the holding member 270 is harder than the material of the explosion-proof valve 250. For example, a thermoplastic resin or metal, which is easily molded, is preferred. As the thermoplastic resin, examples of thermoplastic resins except for elastomer can include polybutylene terephthalate (PBT), polyethylene terephthalate (PET), polyphenylene sulfide (PPS), polysulfone (PS), polypropylene (PP), polyethylene (PE), ABS resin or a composite material thereof. Moreover, the examples of the material of the holding member 270 can include a composite material made by combining a reinforcement, such as glass fiber or carbon fiber, or metal with the thermoplastic resin to improve heat resistance, humidity resistance, dimensional stability, rigidity, or the like.

The molding method of the holding member 270 is not particularly limited; examples thereof can include injection molding, compression molding, die-casting or cutting. Moreover, the holding member 270 may be molded by cutting after die-casting.

(Explosion-Proof Valve 250)

The explosion-proof valve 250 includes an annular portion 251 provided at the center and having an annular shape, and an inclined portion 252 extending from an outer circumferential part of the annular portion 251 in a direction inclined downwardly with respect to the centerline direction.

The inner diameter of the annular portion 251 is not more than the outer diameter of the inserted portion 232 of the support body 230, and the outer diameter of the annular portion 251 is larger than the outer diameter of the support portion 231 of the support body 230 or the outer diameter of the central protruding part 271a of the holding member 270. The annular portion 251 is press-fitted into the inserted portion 232 of the support body 230, and thereby the explosion-proof valve 250 is supported by the support body 230.

The inclined portion 252 extends obliquely downward from the whole circumference of the outer circumferential part of the annular portion 251, and when viewed in FIG. 9, the inclined portion 252 includes an upper surface 252a positioned at the upper side, a lower surface 252b positioned at the lower side, and a contact surface 252c intersecting the centerline direction to be brought into contact with the bottom portion 271 of the holding member 270. The position where the contact surface 252c contacts a top surface of the bottom portion 271 of the holding member 270 is provided outside of the surrounding through holes 271c formed in the bottom portion 271. In other words, the radius from the centerline C in the contact surface 252c is larger than the distance from the centerline C to an outermost part of the surrounding through holes 271c.

In the explosion-proof valve 250, the annular portion 251 is sandwiched between the support portion 231 of the support body 230 and the central protruding part 271a of the bottom portion 271 in the holding member 270. Then, in the state where the annular portion 251 is sandwiched between the support portion 231 of the support body 230 and the central protruding part 271a of the holding member 270, the contact surface 252c is brought into contact with the top surface of the bottom portion 271 in the holding member 270. The contact surface 252c is brought into contact with the top surface of the bottom portion 271 of the holding member 270, and thereby a first flow path R1 (refer to FIG. 10), through which the gases circulate between the inside of the housing 120 and the outside of the housing 120 via the surrounding through holes 271c formed in the bottom portion 271 of the holding member 270, is closed.

The explosion-proof valve 250 is an elastic body, and examples of the material thereof can include a thermosetting elastomer or a thermosetting rubber that is not softened by heating within a certain range and has high heat resistance.

Then, the annular portion 251 is sandwiched between the support portion 231 of the support body 230 and the central protruding part 271a of the bottom portion 271 in the holding member 270, and thereby the explosion-proof valve 250 seals between the support body 230 and the holding member 270. In other words, between the support body 230 and the holding member 270, the explosion-proof valve 10 prevents liquids and solids from penetrating into the inside of the housing 120 from the outside of the housing 120 while blocking circulation of gases between the inside of the housing 120 and the outside of the housing 120.

Figure 10:
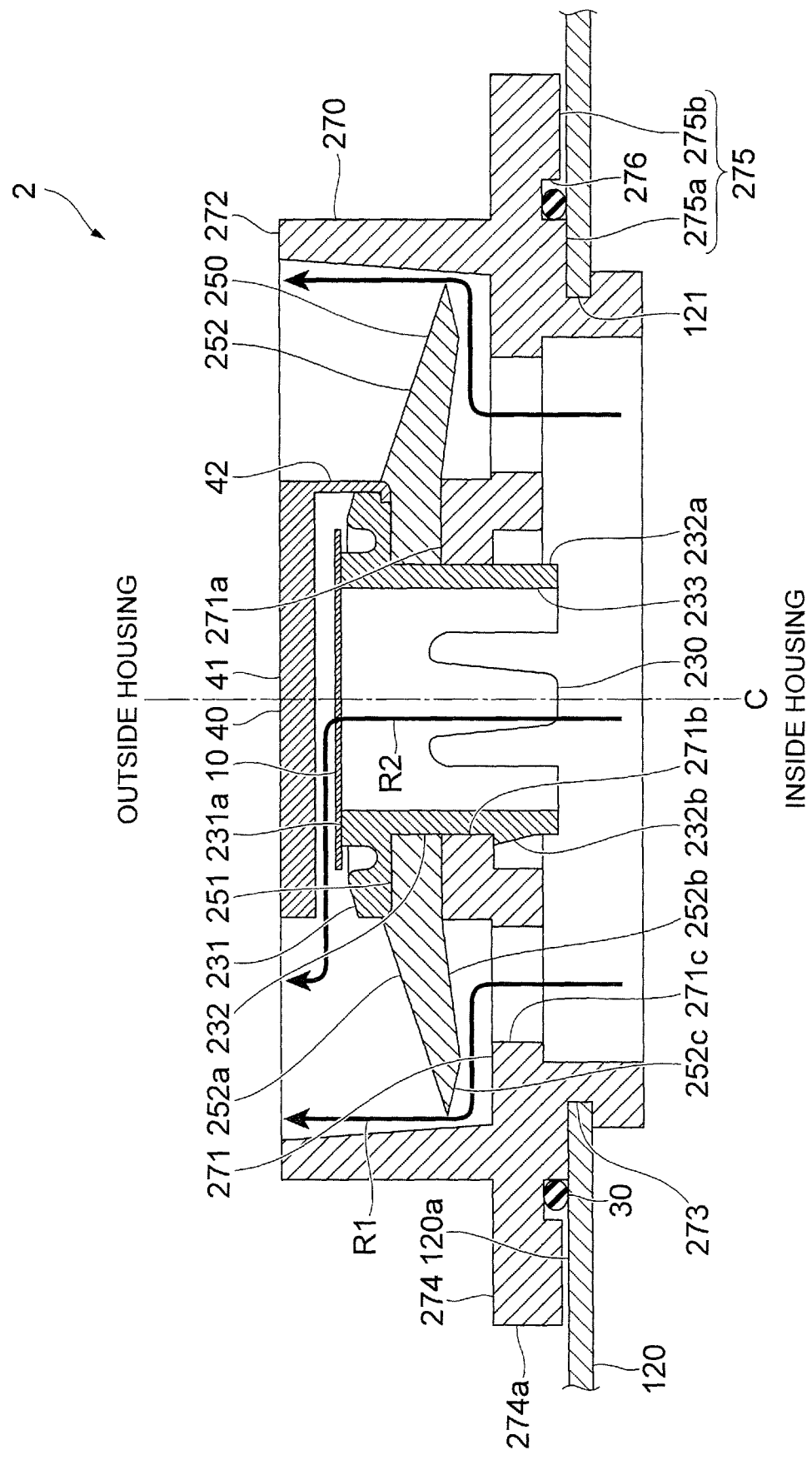
FIG. 10 is a diagram showing a state where an explosion-proof valve opened a first flow path R1.

FIG. 10 is a diagram showing a state where the explosion-proof valve 250 opened the first flow path R1.

The explosion-proof valve 250 is elastically deformed when the internal pressure, which is the pressure inside the housing 120, is higher than the external pressure, which is the pressure outside the housing 120, by a value not less than a predetermined value, and the contact surface 252c is separated from the bottom portion 271 of the holding member 270, to thereby open the first flow path R1.

To put it another way, when the pressure difference between the internal pressure and the external pressure is less than a predetermined value, the explosion-proof valve 250 closes the first flow path R1 by bringing the contact surface 252c into contact with the bottom portion 271 of the holding member 270. Then, the shape (the width between the upper surface 252a and the lower surface 252b) or material of the inclined portion 252 is determined so that, when the internal pressure is higher than the external pressure by a value not less than a predetermined value, elastic deformation is caused and the contact surface 252c is separated from the bottom portion 271 of the holding member 270, to thereby open the first flow path R1.

Note that, when the external pressure is higher than the internal pressure, the contact surface 252c is kept in contact with the bottom portion 271 of the holding member 270, and accordingly, the explosion-proof valve 250 continues to close the first flow path R1. Consequently, the explosion-proof valve 250 prevents liquids and solids from penetrating into the inside of the housing 120 from the outside of the housing 120, while blocking circulation of gases between the inside of the housing 120 and the outside of the housing 120, via the first flow path R1.

(Action)

In the ventilation unit 2 configured as described above, when a pressure difference is generated between the pressure inside the housing 120 (internal pressure) and the pressure outside the housing 120 (external pressure), the pressure difference is eliminated by allowing gases to circulate between the inside of the housing 120 and the outside of the housing 120 via the ventilation membrane 10. In other words, the flow paths configured with the communicating hole 233 formed in the support portion 231 of the support body 230 or the gaps between the extending portions 42 of the cover 40 function as a second flow path R2 of gases circulating between the inside of the housing 120 and the outside of the housing 120. When the pressure difference is generated between the internal pressure and the external pressure, the pressure difference is eliminated by allowing the gases to circulate through the second flow path R2 via the ventilation membrane 10.

If the pressure inside the housing 120 (the internal pressure) is rapidly increased, such as when abnormality occurs in the battery 110, the contact surface 252c of the explosion-proof valve 250 is separated from the bottom portion 271 of the holding member 270, and the explosion-proof valve 250 is elastically deformed to open the first flow path R1. Consequently, gases flow from the inside of the housing 120 to the outside of the housing 120 via the first flow path R1, and thereby the pressure difference between the pressure inside the housing 120 (the internal pressure) and the pressure outside the housing 120 (the external pressure) is eliminated.

(Assembly)

The ventilation unit 2 configured as described above is assembled as follows.

First, the ventilation membrane 10 is supported (for example, by welding) by the support body 230 of the internal pressure adjusting component 220, and the inward protruding parts 42a of the cover 40 are fitted into the concave parts 231c formed in the support body 230, and thereby the internal pressure adjusting component 220 is assembled. After the internal pressure adjusting component 220 is assembled, the annular portion 251 of the explosion-proof valve 250 is press-fitted into the inserted portion 232 of the support body 230 in the internal pressure adjusting component 220, to thereby integrate the internal pressure adjusting component 220 and the explosion-proof valve 250. Other than this, examples of the integrating method can include joining by welding the explosion-proof valve 250 to the support body 230 of the internal pressure adjusting component 220. Moreover, the explosion-proof valve 250 and the support body 230 of the internal pressure adjusting component 220 may be bonded by a bonding agent or a double-faced tape. In addition, the explosion-proof valve 250 and the support body 230 of the internal pressure adjusting component 220 may be integrated by insert molding. Then, the internal pressure adjusting component 220 supporting the explosion-proof valve 250 is inserted into the center portion through hole 271b formed in the bottom portion 271 of the holding member 270.

Figure 11A:
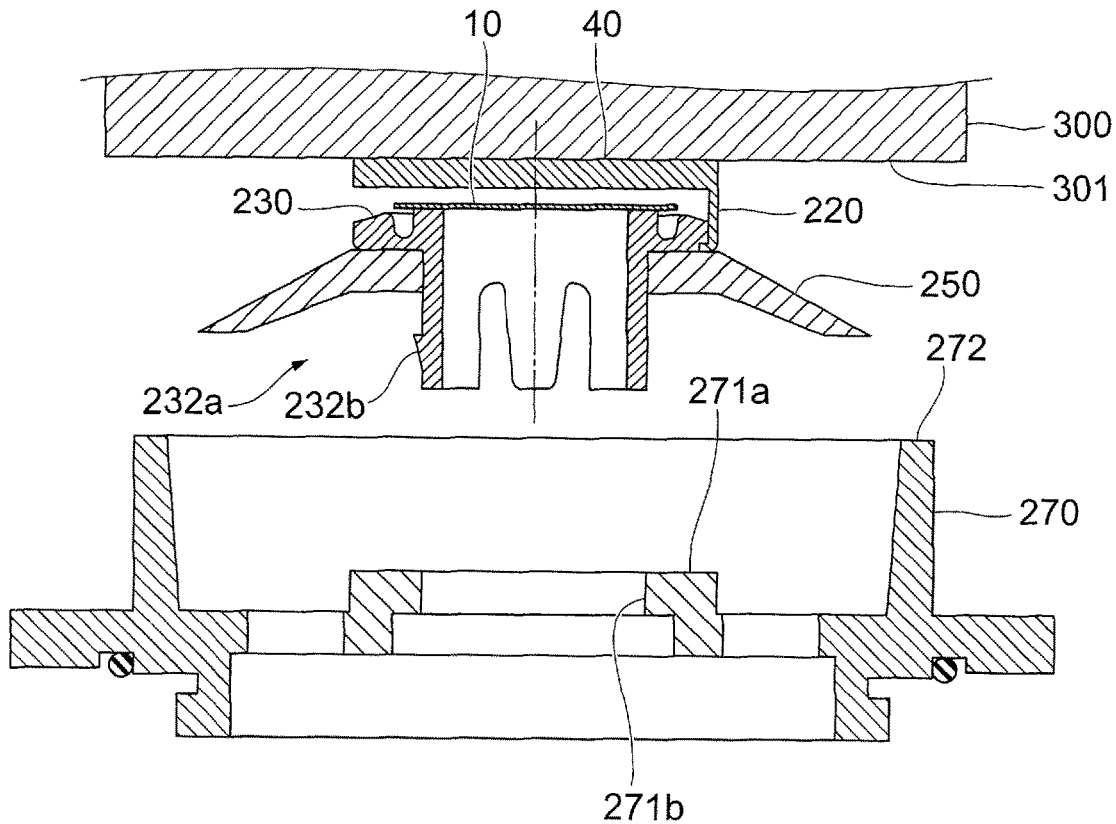
FIG. 11A is a diagram showing a state before an internal pressure adjusting component is inserted into a holding member.
Figure 11B:
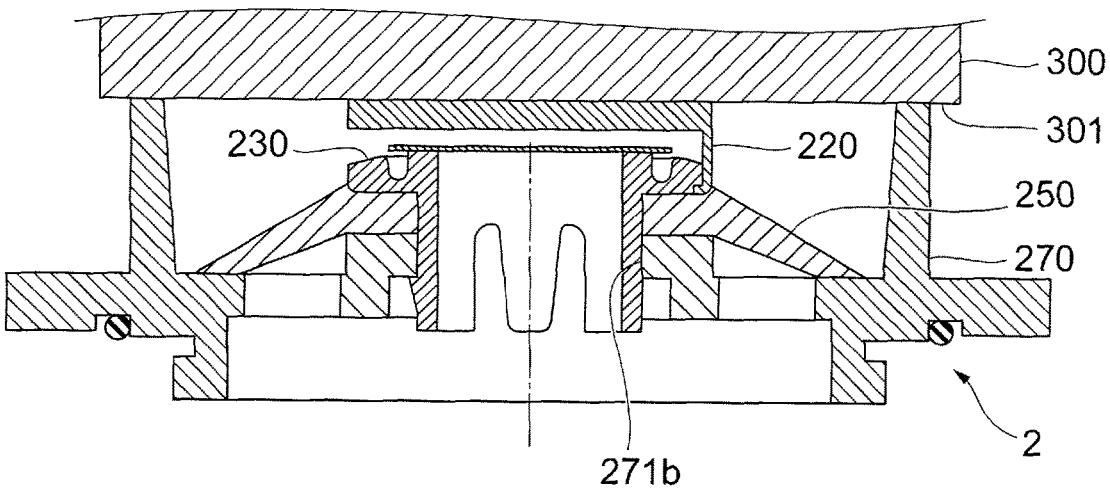
FIG. 11B is a diagram showing a state after the internal pressure adjusting component is inserted into the holding member.

FIG. 11A is a diagram showing a state before the internal pressure adjusting component 220 is inserted into the holding member 270. FIG. 11B is a diagram showing a state after the internal pressure adjusting component 220 is inserted into the holding member 270.

When the internal pressure adjusting component 220 is inserted into the center portion through hole 271b formed in the holding member 270, the top portion 41 of the cover 40 in the internal pressure adjusting component 220 is pressurized by a surface larger than the outer diameter of the side portion 272 of the holding member 270, for example, a jig 300 with a lower end surface 301, which is a circle having a diameter larger than the outer diameter of the side portion 272 of the holding member 270. Then, as shown in FIG. 11B, the internal pressure adjusting component 220 is pressed into the holding member 270 until the lower end surface 301 of the jig 300 butts against the side portion 272 of the holding member 270. Consequently, the outward protruding parts 232b of the leg portions 232a in the inserted portion 232 of the support body 230 are positioned below the center portion through hole 271b formed in the bottom portion 271 of the holding member 270. Then, the outward protruding parts 232b of the support body 230 butt against the bottom portion 271 of the holding member 270, and thereby the internal pressure adjusting component 220 is prevented from being detached from the holding member 270.

(Inspection)

In the ventilation unit 2 related to the second exemplary embodiment, after the ventilation unit 2 is assembled, it is possible to easily inspect whether or not the explosion-proof valve 250 functions. In other words, it is possible to inspect that, when the pressure on the lower surface 252b side of the inclined portion 252 of the explosion-proof valve 250 is increased to be higher than the pressure on the upper surface 252a side of the inclined portion 252 by a value not less than a predetermined value, the contact surface 252c of the explosion-proof valve 250 is separated from the bottom portion 271 of the holding member 270, to thereby open the first flow path R1.

For example, if the explosion-proof valve performs the opening operation with breaking or dropping off of partial components, the inspection of whether or not the explosion-proof valve functions accompanies actual breaking or dropping off; therefore, the inspection cannot be performed easily. For example, it is difficult to use components broken by the inspection for products.

In contrast thereto, in the ventilation unit 2, the explosion-proof valve 250 is elastically deformed to separate the contact surface 252c from the bottom portion 271 of the holding member 270, and thereby the first flow path R1 is opened. Therefore, since the contact surface 252c is brought into contact with the bottom portion 271 of the holding member 270 to close the first flow path R1 after the inspection is completed, the ventilation unit 2 can be used as a product after inspection.

Figure 12:
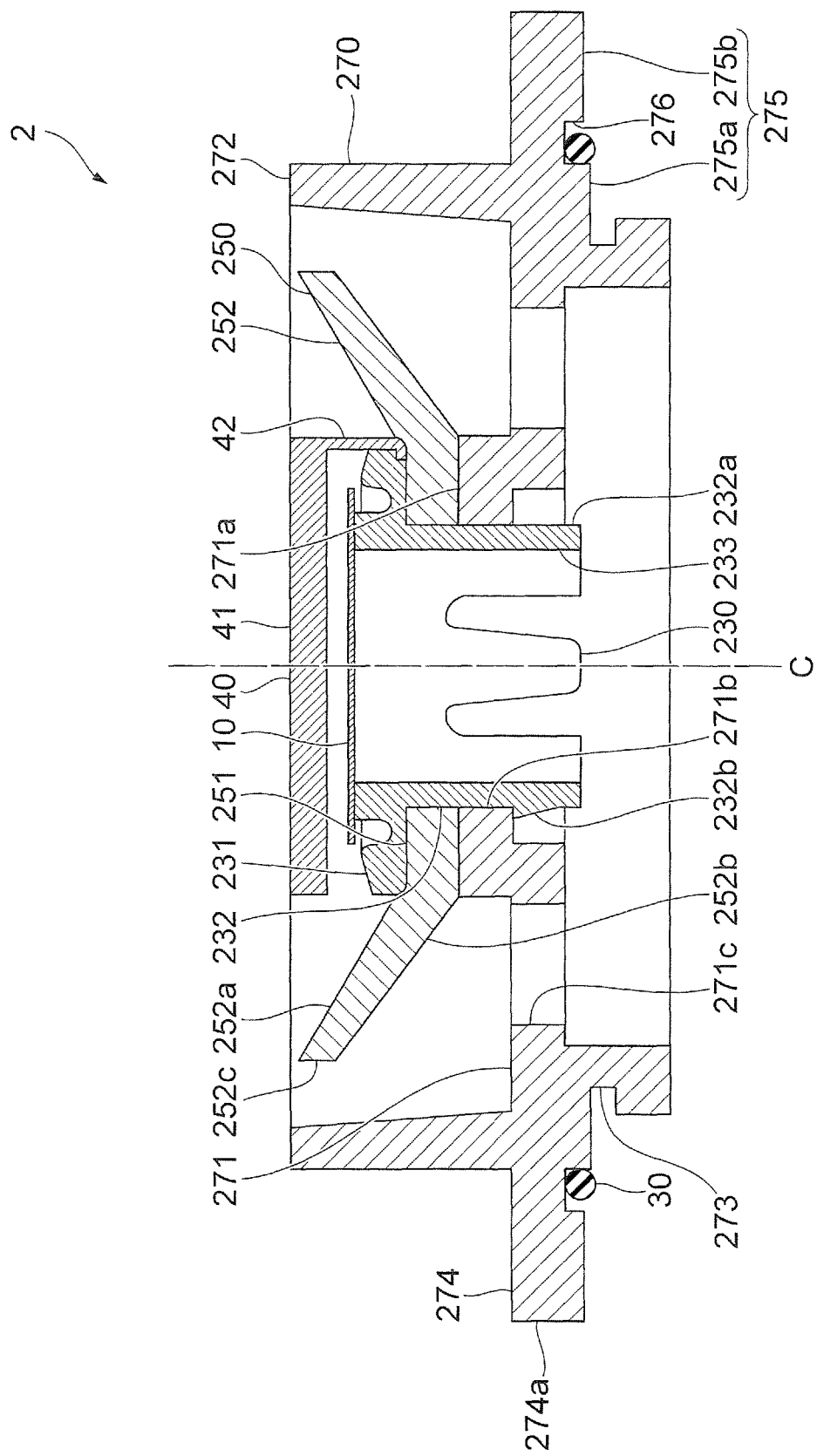
FIG. 12 is a diagram showing an example of a state after a function of the explosion-proof valve was inspected.

FIG. 12 is a diagram showing an example of a state after the function of the explosion-proof valve 250 was inspected. In the state shown in FIG. 12, the inclined portion 252 is deformed so that the upper surface 252a and the lower surface 252b are reversed with respect to the annular portion 251 as a fulcrum (the upper surface 252a is positioned inside (the centerline C side) and the lower surface 252b is positioned outside).

Even though the deformation in the state shown in FIG. 12 is achieved by increasing the pressure on the lower surface 252b side of the inclined portion 252 of the explosion-proof valve 250 to be higher than the pressure on the upper surface 252a side of the inclined portion 252 by a value not less than a predetermined value, the contact surface 252c can be returned again to contact the bottom portion 271 of the holding member 270, to thereby close the first flow path R1, because the material of the explosion-proof valve 250 is the thermosetting elastomer or the thermosetting rubber. From this, according to the ventilation unit 2, it is also possible to easily inspect whether or not the explosion-proof valve 250 functions after the ventilation unit 2 has been assembled, as compared to the case where, for example, the explosion-proof valve performs the opening operation with breaking or dropping off of partial components.

Note that, in the above-described second exemplary embodiment, the mode in which the internal pressure adjusting component 220 and the explosion-proof valve 250 are integrated is taken as an example; however, the present invention is not particularly limited to such a mode. For example, the internal pressure adjusting component 220 and the explosion-proof valve 250 may be separately assembled to the holding member 270 in a state not to be integrated. Even in such a case, it is desirable that, when the internal pressure adjusting component 220 is attached to the holding member 270, the annular portion 251 of the explosion-proof valve 250 is sandwiched between the internal pressure adjusting component 220 and the holding member 270 in the state of being compressed therebetween to seal between the internal pressure adjusting component 220 and the holding member 270.

As described above, the ventilation unit 2 related to the second exemplary embodiment includes: the ventilation membrane 10; and the support body 230 and the holding member 270 as an example of the support member supporting the ventilation membrane 10 and attached to the insertion hole 121 as an example of the opening portion formed in the housing 120. The ventilation unit 2 also includes the O ring 30 disposed between the outer surface 120*a* around the insertion hole 121 in the housing 120 and the holding member 270 to seal the gap between the holding member 270 and the housing 120. The holding member 270 includes: the annular concave portion 276 as an example of the attachment portion to which the O ring 30 is to be attached; and the bottom portion 271, the side portion 272 and the outward protruding part 274 as an example of the wall portion provided around the annular concave portion 276. Then, in the state where the O ring 30 is attached between the holding member 270 and the housing 120, the distance La between the O ring 30 and the outer circumferential surface 274*a* as an example of the external surface in the outward protruding part 274 of the holding member 270 is 5.0 mm or more.

According to the ventilation unit 2 related to the second exemplary embodiment configured as described above, as shown in the test results in FIG. 6, the ventilation unit 2 prevents water or the like from entering the inside of the housing 120 through the gap between the holding member 270 and the outer surface 120*a* of the housing 120. That is, according to the ventilation unit 2, even in the car washing operation by high-pressure water jetting, the O ring 30 hardly gets wet directly by the high-pressure water, and therefore, deformation of the O ring 30 can be prevented. As a result, entrance of the water or the like into the housing 120 due to deformation of the O ring 30 can be prevented.

The ventilation unit 2 further includes the explosion-proof valve 250 that allows gas to flow from the inside of the housing 120 to the outside of the housing 120 in the case where the internal pressure, which is the pressure inside the housing 120, is higher than the external pressure, which is the pressure outside the housing 120, by a value not less than the predetermined pressure, and blocks the ventilation of the gas in the case where the pressure difference between the internal pressure and the external pressure is less than the predetermined pressure. This realizes elimination of differential pressure in the case where the pressure inside the housing 120 (internal pressure) sharply increases, such as a time of abnormality in the battery 110, and elimination of differential pressure at normal times, while making it possible to perform inspection at the time of shipment.

Note that, in the ventilation unit 2 related to the above-described second exemplary embodiment, the attaching portion 273 of the holding member 270 is inserted into the insertion hole 121 of the housing 120 and the protruding parts 273*b* of the attaching portion 273 butt against the surface inside the housing 120; therefore the holding member 270 is prevented from being detached from the housing 120. However, the method of attaching the ventilation unit 2 to the housing 120 is not particularly limited. For example, the holding member 270 may be press-fitted into the housing 120. Moreover, for example, a male thread may be formed on the outer circumferential surface of the cylindrical part 273*a*, instead of providing the protruding parts 273*b* to the attaching portion 273, to be screwed into a female thread formed in the housing 120 or a female thread of a nut fastened in the housing 120, to thereby attach the ventilation unit 2 to the housing 120.

REFERENCE SIGNS LIST 1, 2 Ventilation unit
10 Ventilation membrane
20, 230 Support body
30 O ring
250 Explosion-proof valve
270 Holding member

The invention claimed is:

1. A ventilation unit comprising:
    a ventilation body configured to allow gas to circulate between outside and inside of a housing;
    a support supporting the ventilation body and configured to be attached to an opening in the housing; and
    a seal configured to be between an outer surface of the housing around the opening and the support to seal a gap between the outer surface and the support,
    wherein
    the support includes an attachment portion to which the seal is attached and a wall surrounding the attachment portion, and
    the ventilation unit is configured so that a distance between the seal and an external surface of the wall is 5.0 mm or more when the ventilation unit is attached to the housing.

2. The ventilation unit according to claim 1, wherein a portion of the wall facing the outer surface is parallel to the outer surface, and the external surface is perpendicular to the outer surface.

3. The ventilation unit according to claim 1, wherein the ventilation unit is configured so that a distance between a portion in the wall facing the outer surface and the outer surface is 0.05 mm to 2.0 mm.

4. The ventilation unit according to claim 2, wherein the ventilation unit is configured so that a distance between the portion of the wall facing the outer surface of the housing and the outer surface is 0.05 mm to 2.0 mm.

5. The ventilation unit according to claim 1, wherein the seal is annular and has a wire diameter of 2.4 mm.

6. The ventilation unit according to claim 2, wherein the seal is annular and has a wire diameter of 2.4 mm.

7. The ventilation unit according to claim 3, wherein the seal is annular and has a wire diameter of 2.4 mm.

8. The ventilation unit according to claim 4, wherein the seal is annular and has a wire diameter of 2.4 mm.

9. The ventilation unit according to claim 1, further comprising:
    a ventilation member configured to allow gas to flow from the inside of the housing to the outside of the housing when an internal pressure of the housing is higher than an external pressure by not less than a predetermined value, and configured to block the gas from flowing when a difference between the internal pressure and the external pressure is less than the predetermined value.

10. The ventilation unit according to claim 2, further comprising:
    a ventilation member configured to allow gas to flow from the inside of the housing to the outside of the housing when an internal pressure of the housing is higher than an external pressure by not less than a predetermined value, and configured to block the gas from flowing when a difference between the internal pressure and the external pressure is less than the predetermined value.

11. The ventilation unit according to claim 3, further comprising:
    a ventilation member configured to allow gas to flow from the inside of the housing to the outside of the housing when an internal pressure of the housing is higher than an external pressure by not less than a predetermined value, and configured to block the gas from flowing when a difference between the internal pressure and the external pressure is less than the predetermined value.

12. The ventilation unit according to claim 4, further comprising:

a ventilation member configured to allow gas to flow from the inside of the housing to the outside of the housing when an internal pressure of the housing is higher than an external pressure by not less than a predetermined value, and configured to block the gas from flowing when a difference between the internal pressure and the external pressure is less than the predetermined value.

13. The ventilation unit according to claim 5, further comprising:

a ventilation member configured to allow gas to flow from the inside of the housing to the outside of the housing when an internal pressure of the housing is higher than an external pressure by not less than a predetermined value, and configured to block the gas from flowing when a difference between the internal pressure and the external pressure is less than the predetermined value.

14. The ventilation unit according to claim 6, further comprising:

a ventilation member configured to allow gas to flow from the inside of the housing to the outside of the housing when an internal pressure of the housing is higher than an external pressure by not less than a predetermined value, and configured to block the gas from flowing when a difference between the internal pressure and the external pressure is less than the predetermined value.

15. The ventilation unit according to claim 7, further comprising:

a ventilation member configured to allow gas to flow from the inside of the housing to the outside of the housing when an internal pressure of the housing is higher than an external pressure by not less than a predetermined value, and configured to block the gas from flowing when a difference between the internal pressure and the external pressure is less than the predetermined value.

16. The ventilation unit according to claim 8, further comprising:

a ventilation member configured to allow gas to flow from the inside of the housing to the outside of the housing when an internal pressure of the housing is higher than an external pressure by not less than a predetermined value, and configured to block the gas from flowing when a difference between the internal pressure and the external pressure is less than the predetermined value.

17. The ventilation unit according to claim 9, wherein the ventilation body allows gas to circulate between the inside of the housing and the outside of the housing while the difference between the internal pressure and the external pressure is less than the predetermined value.

18. The ventilation unit according to claim 1, wherein the support includes a surface between the seal and the opening that is configured to abut the housing.

\* \* \* \* \*